US010931518B2

(12) United States Patent
Vanden Berg et al.

(10) Patent No.: US 10,931,518 B2
(45) Date of Patent: *Feb. 23, 2021

(54) SYSTEM AND METHOD FOR CONFIGURING NETWORKS

(71) Applicant: CSG Systems, Inc., Greenwood Village, CO (US)

(72) Inventors: Matthew Vanden Berg, Tarragindi (AU); Christopher E. Lerato, Dutton Park (AU)

(73) Assignee: CSG Systems, Inc., Greenwood Village, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/432,495

(22) Filed: Jun. 5, 2019

(65) Prior Publication Data
US 2020/0127889 A1 Apr. 23, 2020

Related U.S. Application Data

(63) Continuation of application No. 16/166,288, filed on Oct. 22, 2018, now Pat. No. 10,341,172.

(51) Int. Cl.
G06F 16/24 (2019.01)
H04L 12/24 (2006.01)
G06F 16/22 (2019.01)
G06F 16/951 (2019.01)
G06F 16/23 (2019.01)
G06F 16/2453 (2019.01)
G06F 16/2455 (2019.01)

(52) U.S. Cl.
CPC .............. *H04L 41/08* (2013.01); *G06F 16/22* (2019.01); *G06F 16/23* (2019.01); *G06F 16/2336* (2019.01); *G06F 16/2343* (2019.01); *G06F 16/2455* (2019.01); *G06F 16/24532* (2019.01); *G06F 16/24535* (2019.01); *G06F 16/24542* (2019.01); *G06F 16/951* (2019.01)

(58) Field of Classification Search
CPC ...................................... G06F 16/24
USPC .................. 707/610, 703, 999.002
See application file for complete search history.

(56) References Cited

U.S. PATENT DOCUMENTS

| | | | |
|---|---|---|---|
| 6,289,334 B1 * | 9/2001 | Reiner | G06F 16/24532 |
| 8,285,711 B2 * | 10/2012 | Bordawekar | G06F 16/8365 |
| | | | 707/718 |
| 9,363,149 B1 | 6/2016 | Chauhan | |
| 9,516,052 B1 | 12/2016 | Chauhan | |
| 10,341,172 B1 | 7/2019 | Vanden Berg | |
| 2007/0250470 A1 | 10/2007 | Duffy | |
| 2015/0331898 A1 | 11/2015 | Ou | |
| 2016/0171068 A1 | 6/2016 | Hardin | |
| 2017/0031565 A1 | 2/2017 | Chauhan | |
| 2017/0031659 A1 | 2/2017 | Burke | |

(Continued)

Primary Examiner — Baoquoc N To
(74) Attorney, Agent, or Firm — Fitch, Even, Tabin & Flannery LLP

(57) ABSTRACT

A system and method for handling queries where the queries and the answers to those queries are transmitted by means of a network which may have significantly variable latencies. The system and method involve copying the queries and calculating a response to each copy of the query and sending each response over the network. The first-received response can then be acted upon. The query may be divided up into sub-queries which are then replicated and sent for determination.

22 Claims, 4 Drawing Sheets

(56) References Cited

U.S. PATENT DOCUMENTS

| | | |
|---|---|---|
| 2017/0075965 A1 | 3/2017 | Liu |
| 2018/0089258 A1 | 3/2018 | Bhattacharjee |
| 2018/0089259 A1 | 3/2018 | James |
| 2018/0089262 A1 | 3/2018 | Bhattacharjee |
| 2018/0089269 A1 | 3/2018 | Pal |
| 2018/0089278 A1 | 3/2018 | Bhattacharjee |
| 2018/0089306 A1 | 3/2018 | Pal |
| 2018/0089312 A1 | 3/2018 | Pal |
| 2018/0089324 A1 | 3/2018 | Pal |
| 2018/0314731 A1 | 11/2018 | Mathew |
| 2018/0314744 A1 | 11/2018 | Mathew |
| 2018/0357304 A1 | 12/2018 | Balasubrahmanian |

* cited by examiner

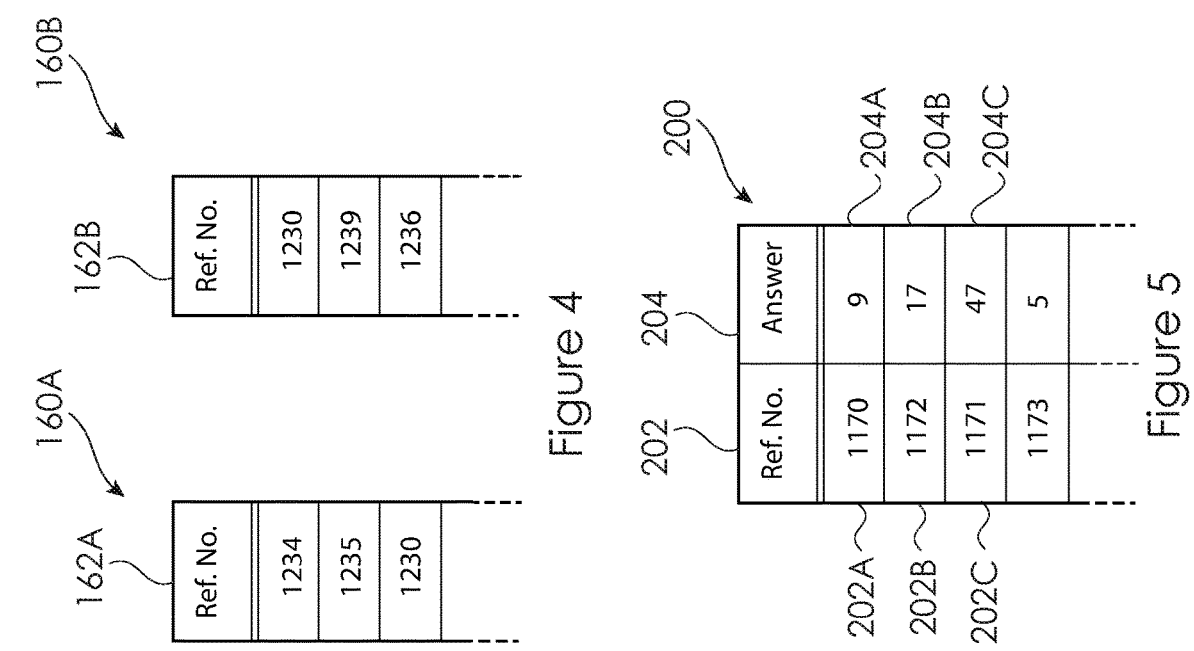
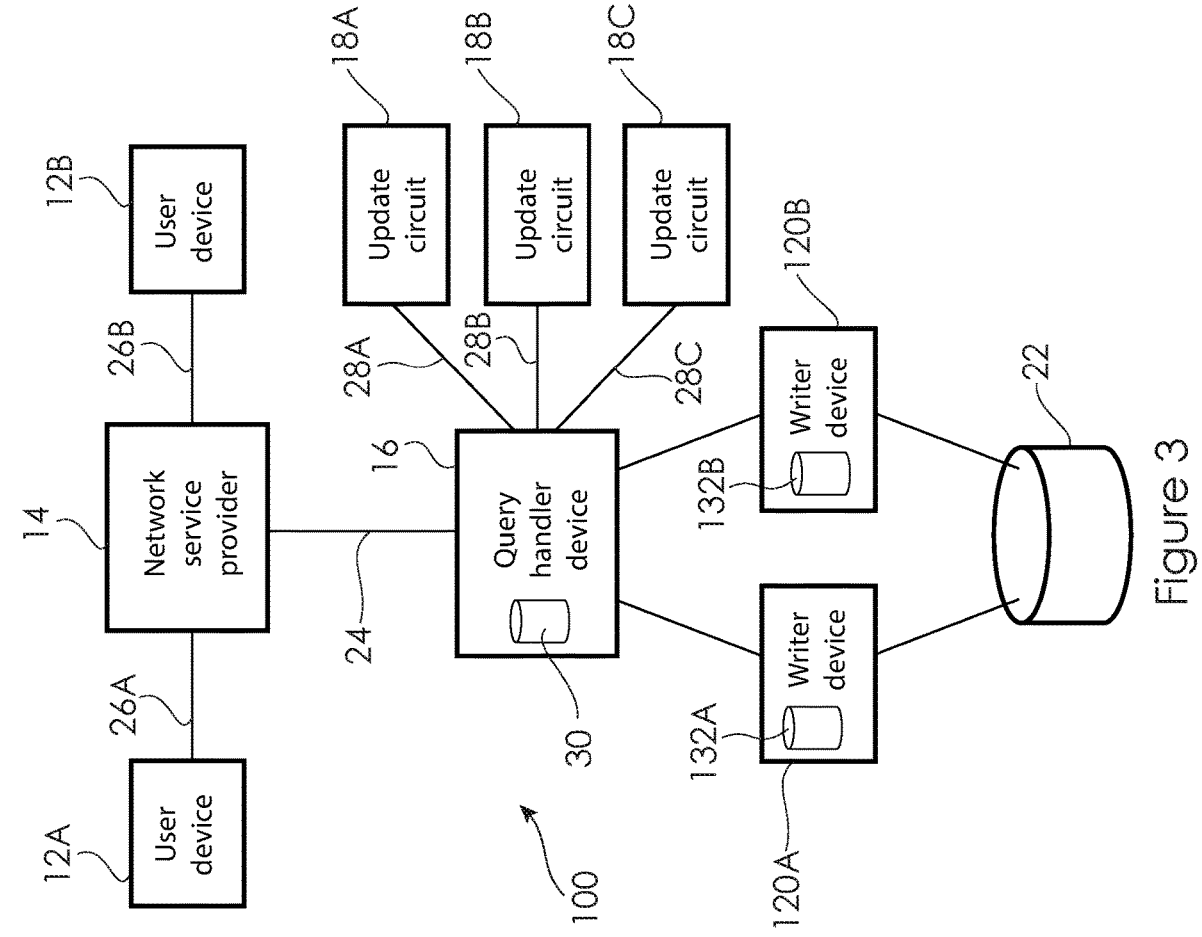

SYSTEM AND METHOD FOR CONFIGURING NETWORKS

CROSS-REFERENCE TO RELATED APPLICATIONS

This application is a continuation of U.S. patent application Ser. No. 16/166,288, filed Oct. 22, 2018, which is hereby incorporated by reference in its entirety.

TECHNICAL FIELD

This disclosure relates to provisioning (or configuring) electronic networks and/or balance management systems.

BACKGROUND

Increasingly, computing resources are becoming more networked. Resources such as processors and memory stores were previously provided in a single hardware installation, such as the personal computer ("PC"). Traditionally, computing networks were used to link such hardware instantiations together.

Over time, computing networks have evolved so that disparate parts of the computing device may be connected by what was traditionally considered as a network. For example, it is no longer necessary for the processor and nonvolatile memory to be connected via a computing bus. In the modern computing environment, the capacity and speed of networks has increased to the point where transport and switching speeds previously only attainable at the relatively small scale of a computing bus can now be achieved over much larger distances using a network.

One of the commercial consequences of this has been the advent of "cloud computing". The central tenant of "cloud computing" is that computing resources can be accessed via a network and that the consumer is able to pay for the quantity of computing resources they require, as needed. The primary advantage to the consumer is that they do not need to pay for resources which they are not using.

However, by taking advantage of economies of scale, the providers of these cloud computing resources ("cloud") may be required to deploy different resources at disparate locations. Therefore, it can be difficult to guarantee or predict the precise characteristics of the resources which are provided under all circumstances.

BRIEF DESCRIPTION OF THE DRAWINGS

For a more complete understanding of the disclosure, reference should be made to the following detailed description and accompanying drawings wherein:

FIG. 3 comprises a diagram of a system as configured in accordance with various embodiments of these teachings;

FIG. 4 comprises a diagram of data records used with the system of FIG. 3 as configured in accordance with various embodiments of these teachings;

FIG. 5 comprises a diagram of data records used with the system of FIG. 3 as configured in accordance with various embodiments of these teachings;

DETAILED DESCRIPTION

Figures 1, 2:
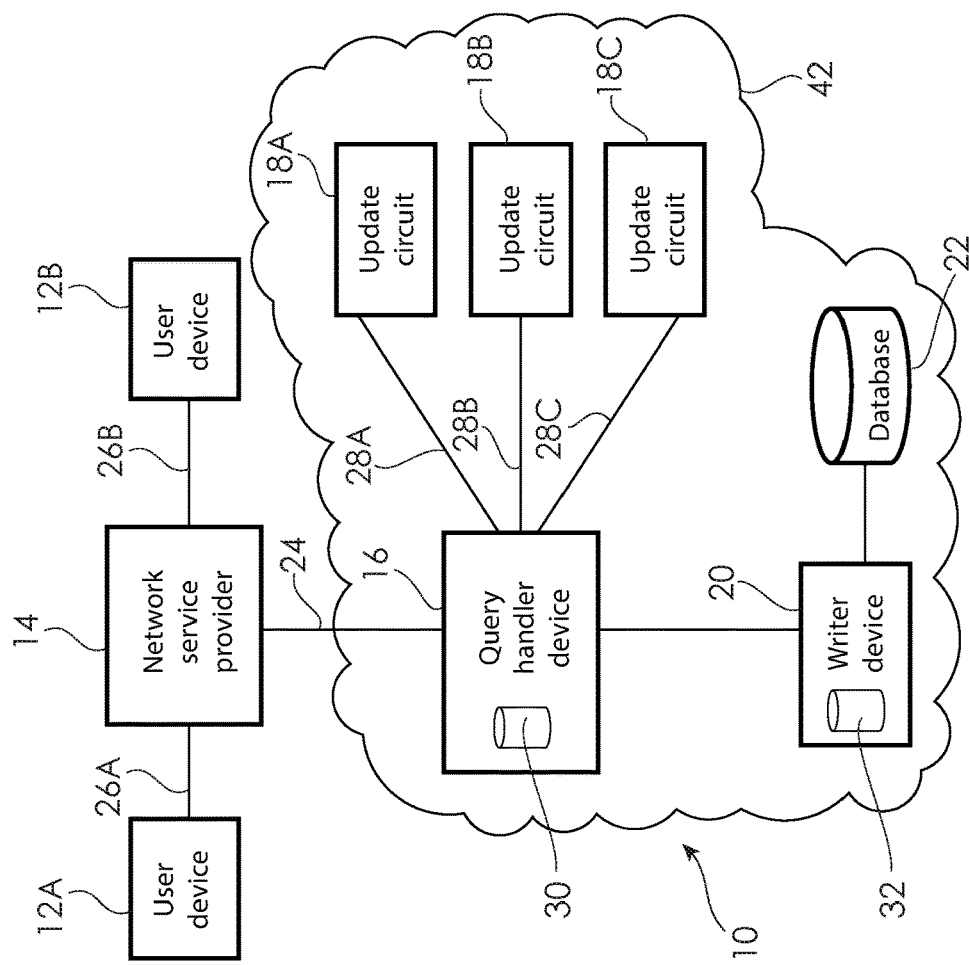
FIG. 1 comprises a diagram of a system as configured in accordance with various embodiments of these teachings.
FIG. 2 comprises a diagram of data records used with the system of FIG. 1 as configured in accordance with various embodiments of these teachings.

Generally speaking, a system and method are utilized to configure an electronic network.

In certain embodiments, one or more of the networks which are configured is a telecommunications network. However, further embodiments find application outside of the field of telecommunications. Certain embodiments are applicable to a new scenario where it is desirable to complete the calculation within a limited time frame.

In many of these embodiments, the system comprises:
a query handler device, the query handler device being coupled to a first electronic communication network, the query handler device being disposed at a central processing location;
a plurality of update circuits, each of the plurality of update circuits being arranged to operate electronically in parallel with the others, the plurality of update circuits being coupled to the query handler device;
a database, the database storing data entries that include subscriber information;
at least one writer device, the at least one writer device being coupled to the database;
wherein the query handler device is configured to:
receive a query from a network service provider;
copy the query to form a set of queries, wherein each member of the set is a copy of the query;
transmit each query in the set of queries to an individual one of the update circuits;
wherein each of the update circuits is configured to:
receive one query from the set of queries;
determine an answer to the received query, the answer being determined in parallel time relation with respect to answers being determined at other update circuits;
transmit the answer to the query handler;
wherein one of the answers is a first answer, the first answer being received by the query handler device first-in-time compared to the other answers, wherein the first answer is transmitted to the at least one writer device;
wherein the at least one writer device is configured to:
receive the first answer;
adjust an entry in the database according to the first answer using a write operation such that no other adjustment to the entry can occur until the write operation is completed;
wherein the query handler device is configured to transmit the first answer to the network service provider via the first electronic communication network;
wherein the network service provider responsively adjusts and configures electronic network elements in a second electronic communication network in conformance with the first answer.

It is to be realized that the "first answer" need not necessarily be the first answer received chronologically from the update circuits. In certain embodiments this may be the first selected answer.

The electronic network elements may be elements of the network administered and controlled by the network service provider. In one example, the electronic network elements are mobile devices and the network service provider either establishes or does not establish a communication channel between respective mobile devices according to the answer received and written to the database.

In this embodiment, the answers are written to a database where, it is to be realized, any form of sufficiently persistent data storage with sufficient structure to ensure re-use of the written information may be used.

The answers are here provided by update circuits. Generally, such update circuits are instantiated as central processing units. However, specifically where use is made of cloud computing resources, the precise nature of the hardware which returns the answers may be variable.

The answer to the received query may be determined, at least in part, by accessing stored subscriber information from the database.

The system may further comprise at least one electronic queue, the at least one electronic queue being electronically coupled between the update devices and the at least one writer device, the at least one electronic queue configured to temporarily store the answers determined by the update devices. The system may comprise a single queue or a plurality of separate queues. If the system comprises more than one writer device, each writer device may be associated with a corresponding separate queue.

The at least one writer device may comprise a single writer device or the at least one writer device may comprise a plurality of separate writer devices. When the at least one writer device comprises a plurality of separate writer devices, each writer device may be associated with a corresponding separate queue.

The writer device may lock the query prior to performing the write operation and may remove the lock once the write operation is completed. The lock helps to ensure that multiple writers are able to operate simultaneously without creating write conflicts. Advantageously, the lock may be incorporated into an audit store, the audit store comprising a record of preceding write operations. In this case, the lock may comprise a record in the audit store wherein a writer device querying the audit store may determine whether the current query has previously been, or is currently being, written to the database.

In such circumstances, the audit store may act to facilitate the lock as well as providing a record of previous write operations. Advantageously, this provides means to reimplement previous write operations in the event of a failure.

The system may further comprise a third electronic communication network electronically coupled between the at least one writer device and each of the update circuits, wherein a range of data communication latencies exist between each of the update circuits and the at least one writer device.

The electronic communication networks may comprise an Internet connection. The Internet could be an open Internet connection, an encrypted Internet connect (VPN), or a dedicated connection to the public cloud that is not shared, which may not qualify as an Internet connection. One or more of the update circuits may be provided as part of a cloud computing resource.

The range of latencies may be greater than 3 milliseconds. The range of latencies may be greater than 10 milliseconds. The range of latencies may be greater than 20 milliseconds. The range of latencies may be greater than 100 milliseconds. The range of latencies may be greater than 200 milliseconds. The range of latencies may be greater than 300 milliseconds. The average latency may be less than 3 milliseconds.

The database and the at least one writer device may be disposed at the central processing location. Alternatively, the database and at least one writer device may be located in a networked computing cloud. In such an embodiment the network competing cloud may be the same cloud in which the update circuits are located, or a distinct cloud therefrom.

In others of these embodiments, a method for configuring electronic elements in an electronic communication network is provided, the method comprising:

arranging a plurality of update circuits to operate electronically in parallel with the others;

storing data entries that include subscriber information in a database;

at a query handler device that is disposed at the central processing location, receiving a query from a network service provider, copying the query to form a set of queries, wherein each member of the set is a copy of the query, and transmitting each query in the set of queries to an individual one of the update circuits;

at each of the update circuits, receiving one query from the set of queries, determining an answer to the received query, the answer being determined in parallel time relation with respect to answers being determined at other update circuits, and transmitting the answer to the query handler;

wherein one of the answers is a first answer, the first answer being received by the query handler device first-in-time compared to the other answers, wherein the first answer is transmitted to the at least one writer device;

at the at least one writer device, receiving the first answer, and adjusting an entry in the database according to the first answer using a write operation such that no other adjustment to the entry can occur until the write operation is completed;

at the query handler device, transmitting the first answer to the network service provider via the first electronic communication network;

wherein the network service provider responsively adjusts and configures electronic network elements in a second electronic communication network in conformance with the first answer.

The method may further comprise temporarily storing the answers determined by the update devices in at least one electronic queue, the at least one electronic queue being electronically coupled between the update devices and the at least one writer device. The at least one electronic queue may be a single queue or may comprise a plurality of separate queues.

The at least one writer device may comprise a single writer device or the at least one writer device may comprise a plurality of separate writer devices. When the at least one writer device comprises a plurality of separate writer devices, each writer device may be associated with a corresponding separate queue.

The writer device may lock the query prior to performing the write operation and may remove the lock once the write operation is completed. The lock may comprise a writer device querying the audit store to determine whether the current answer has previously been, or is currently being, written to the database.

The method may further comprise a third electronic communication network electronically coupled between the at least one writer device and each of the update circuits, wherein a range of data communication latencies exist between each of the update circuits and the at least one writer device.

The database and the at least one writer device may be disposed at the central processing location.

In others of these embodiments, distributed processing method involving determining an answer to one or more queries, the method comprising:
- creating a first set of queries by copying an initial query;
- sending each of the first set of queries to a corresponding processor;
- receiving a primary response from one of said processors, the primary response corresponding to one of the first set of queries;
- committing a write in dependence on the primary response;
- returning the primary response to each of said first set of queries.

In this embodiment, each processor may comprise an update circuit.

The primary response may be returned to one or more query of said first set of queries after the write is committed.

The primary response may be the first received response corresponding to one of the first set of queries. In a further embodiment, the primary response is one of the first received responses corresponding to the first set of queries.

The method may further comprise:
- creating a second set of queries by copying a subsequent query;
- sending each of the second set of queries to a corresponding processor;
- receiving a plurality of subsequent responses corresponding to the initial query and the subsequent query; and
- processing a subsequent query while committing the write.

The method may further comprise discarding any subsequent responses corresponding to the initial query while committing the write in dependence on the initial query response.

The write may be performed by one of a plurality of writers, the method further comprising locking a query corresponding to the write.

The method may further comprise associating a sequence with each writer, each queue comprising responses from said processors.

The method may further comprise generating an identity reference for each query prior to copying and storing said identity reference in a store, wherein locking a query comprises marking, in the store, the identity reference corresponding to the locked query. Each query in a set of queries may have the same identity reference.

The method may further comprise removing the lock once the write is complete.

The write in dependence on the response may alter a data entity, in which case the method may further comprise storing, in the store, a state of the data entity prior to alteration and a state of the data entity after alteration.

The method may further comprise, in the event of a failure occurring, repeating one or more of:
- committing a write in dependence on the response;
- returning the response to each of said first set of queries.

When the write changes a data entity in a data object, the method may further comprise preventing any other change of the data entity until the write has been committed.

The write may be committed by a writer and communication between the writer and each processor may occur at least partially by means of a network, the network having a range of latencies between each processor and the writer. The range of latencies may be greater than 3 milliseconds. The range of latencies may be greater than 10 milliseconds. The range of latencies may be greater than 20 milliseconds. The range of latencies may be greater than 100 milliseconds. The range of latencies may be greater than 200 milliseconds. The range of latencies may be greater than 300 milliseconds. The average latency may be less than 3 milliseconds.

At least one of the processors may be hosted in a cloud computing environment.

The write occurs within a persistent data store. The persistent data store may present as a database.

In others of these embodiments, a distributed computing system comprises:
- a query handler for receiving an initial query and creating a first set of queries by copying the query, and sending each of the first set of queries to a corresponding processor;
- a writer for writing data to a data object, wherein the writer receives a primary response from one of said processors and commits a write to the data object in dependence on the primary response;
- wherein the writer returns said primary response to each of said working queries.

The computing system may further comprise an audit store wherein the query handler generates an identity reference for each query prior to copying and said identity reference is stored in the audit store.

The audit store may comprise one or more locks generated by the writer, each lock corresponding to a locked query.

The writer may change a data entity in the data object when committing a write, in which case the audit store may be configured to store a state of the data entity prior to alteration and a state of the data entity after alteration.

In others of these embodiments, a distributed processing method involves determining a response to an initial query, the method comprising:
- creating a first set of queries by copying the initial query;
- creating a second set of queries by coping a subsequent query
- sending each of the first and second sets of queries to a corresponding processor;
- receiving a primary response from one of said processors, the response corresponding to one of the first set of queries;
- discarding any further responses corresponding to the first set; and
- processing a subsequent query while committing the write.

Any further responses corresponding to the first set of queries may be discarded until a write in dependence on the primary response has been committed.

In others of these embodiments, a distributed processing method involves determining a response to an initial query, the method comprising:
- creating a first set of queries by copying the initial query;
- sending each of the first set of queries to a corresponding processor;
- receiving a primary response from one of said processors, the response corresponding to one of the first set of queries;
- querying a store to determine if the initial query is locked;
- performing a write in dependence on the response if the initial query is not locked.

The method may further comprise returning the response to each of said first set of queries.

The data entity may be an entry in a database.

It will be appreciated that the approaches described herein often use a centralized control architecture. More specifically, queries are received and answers to the queries are determined at a central location. Specific electronic hardware and/or software elements are purposely disposed at the central location. Communication with users is provided by electronic communication networks. This particular architecture provides central control (and decision making). A plurality of users can utilize these centralized services and it is not necessary to deploy the same decision-making logic at multiple locations thereby reducing costs. Because of the centralized architecture, the remote user or customer can also perform other tasks at the same time (in parallel) that answers to queries are being determined leading to more efficient system operation.

In other aspects, two or more writer devices may be used. By using two or more writer devices, embodiments are able to distribute writing tasks to the database across multiple writer devices. As the database is often stored on non-volatile memory, the writing operation can be time intensive. Therefore, providing multiple writer devices can significantly increase average write operation times.

It will be understood that the approaches described herein utilize update circuits that are electrically or electronically connected (and operate) in parallel. This particular physical connection (and operation) allows for much faster and more efficient operation, as it allows the system to utilize the first-arriving response.

This can be particularly effective when the update circuits are located remote from the database. For example, when the update circuits are located in a cloud computing environment with a wide range of network latencies, providing multiple answers calculated in parallel helps to ensure that an answer may be provided, and written to the database without undue delay due to varying network latencies.

Furthermore, it is to be realized that the greater the number of update circuits operating in parallel, the greater the potential advantages may be. Since the variations in network latency are difficult, or impossible, to predict, the greater the number of update circuits operating in parallel, the greater the chances that an answer to a query can be provided without delay occurring due to long network latencies.

In still other aspects, the approaches described herein alter and physically transform electronic communication networks. For example, electronic switches, routers, or other electronic elements in one state are changed to different states. Electronic routing switches may be physically adjusted to route information or data in a certain way. In another example, the speed of data may be physically reduced or allowed to be increased for certain users across the network or within certain areas of the network by altering the operation, programming, setting parameters, and/or tuning various electronic elements. In still another example, electronic elements in the network may be configured to halt or prevent data or information movement when customer data limits are reached, or customer bills are unpaid.

In the present approaches, memory writing is a specific electronic hardware operation that prevents a physical memory location from being accessed when the write operation is occurring. Advantageously, this physical restriction as to how data can be accessed prevents multiple and simultaneous write conflicts from occurring.

Referring now to FIG. 1, a system 10 is provided. The system 10 comprises a network service provider 14 and two user devices 12A and 12B connected to the network service provider 14 by corresponding network connections 26A and 26B.

A query handler device 16 is connected to the network service provider 14 by means of a network connection 24. In this embodiment the network connection 24 comprises a first electronic communication network and the network connections 26A and 26B provide a second electronic communication network. The network service provider 14 is, in this embodiment, a telecommunications service provider and the user devices 12A and 12B are handheld mobile telephones. It is to be realized however that embodiments are applicable to many other examples of networked devices, or queries relating to fields other than telecommunications.

In this embodiment, the user device 12A is seeking to establish a communications channel with the user device 12B using the infrastructure provided by network service provider 14. In order to establish the communications channel, it is necessary for the network service provider 14 to establish whether such a communications channel is permitted. In this embodiment, the issue surrounding available funds will be considered. In other words, does the account holder for user device 12A have sufficient cleared funds in their account to permit the opening of a communications channel with user device 12B?

This embodiment is described with reference to the user device 12A establishing a communications channel with the user device 12B. However, embodiments are equally applicable to the network service provider 14 contacting either of the user devices 12A or 12B. Furthermore, as described the decision regarding establishment of the committee occasions channel is here based on the cleared funds for user device 12A. In an alternative embodiment, this decision may additionally be based on the cleared funds corresponding to user device 12B.

This type of question is herein termed a "query" and the system 10 is configured so that the network service provider 14 sends the query to the query handler device 16 across the first communications network comprising network connection 24.

It is to be realized that the nature of the query discussed above is provided merely by way of example. Other embodiments will apply to other kinds of queries, which may not necessarily involve financial information or application in a telecommunications environment.

Turning back to the layout of the system 10, as illustrated in FIG. 1, the query handler device 16 is connected to three update circuits 18A, 18B and 18C by respective network connections 28A, 28B and 28C.

The query handler device 16 is connected to a writer device 20 which is, in turn, connected to a database 22. The update circuits 18A, 18B and 18C, query handler device 16, writer device 20 and database 22 are allocated within a cloud computing environment ("cloud") 42. The cloud 42 is a set of networked computing resources. The cloud is provided by a third party who provides the computing resources as they are available. Therefore, the characteristics of these resources tend to vary considerably. Generally, the provider of the cloud will attempt to allocate resources which are geographically close to the query handler device 16. However, if close resources are not available, more distant resources will be allocated. This, as well as other factors, can negatively affect the latencies.

For certain cloud providers in certain locations, it has been found that the network latencies can vary up to a factor of 100. Certain networks will have an average response time of 3 milliseconds (ms), but exhibit outlying latencies of up to 300 ms. It is to be realized however, that embodiments of the invention are not limited to networks with these specific latency characteristics.

In a further embodiment, the query handler device 16, writer device 20 and database 22 are provided in a single computing device. In a further embodiment, the writer device 20 and database 22 are provided in a separate computing device networked to the query handler device 16. It is also possible for the writer device 20 and database 22 to be provided in a cloud, distinct and separate from the cloud 42. Further configurations of competing devices and networks are also possible.

FIG. 2 illustrates a database table 50 stored in the database 22. The table 50 comprises a subscriber information column 52 and a balance column 54. The plurality of entries are comprised of a subscriber field 52A, 52B, 52C, 52D, . . . etc. stored in the subscriber information column 52 and a balance field 54A, 54B, 54C, 54D, . . . etc. stored in the balance column 54. The terms "row" and "column" are used here for ease of reference, but it is to be realized that embodiments of the invention may be implemented using databases which do not employ the traditional row and column organization.

It is to be realized that the structure and example of the data stored in the database 22 as entries is provided merely by way of example. Other layouts with a greater number of columns (or fewer) are also possible.

The query handler device 16 comprises internal storage 30. Similarly, writer device 20 comprises internal storage 32. The internal storage 30 of query handler device 16 stores audit store 60 illustrated in FIG. 2. The audit store 60 comprises a reference number column 62 and an answer column 64. Records in the audit store 60 comprise a reference number field 62A, 62B, 62C, . . . etc. stored in the reference number column 62 and an answer field 64A, 64B, 64C, . . . etc. stored in the answer column 64.

FIG. 3 illustrates a system 100 according to a further embodiment. The system 100 is similar to the system 10 illustrated in FIG. 1 and like reference numerals are used to denote like features. The system 100 of FIG. 3 differs from the system 10 of FIG. 1 in that it includes two devices 132A and 132B connected between the query handler device 30 and the database 22.

Each writer device is provided with corresponding internal storage 132A and 132B. FIG. 4 illustrates the queues 160A and 160B stored on the internal storage 132A and 132B. The queues 160A and 160B have the same layout as the queue 60 illustrated in FIG. 2, comprising query reference numbers stored sequentially in a reference number column 162A, 162B. FIG. 5 illustrates an audit store 200 comprising a reference number column 202 and an answer column 204. Each record in the audit store 200 has a reference number stored in the reference number field 202A, 202B, 202C, . . . etc. and an answer stored in the answer field 204A, 204B and 204C. The audit store 200 is maintained in the internal storage 30 of the query handler device 16.

Figure 6:
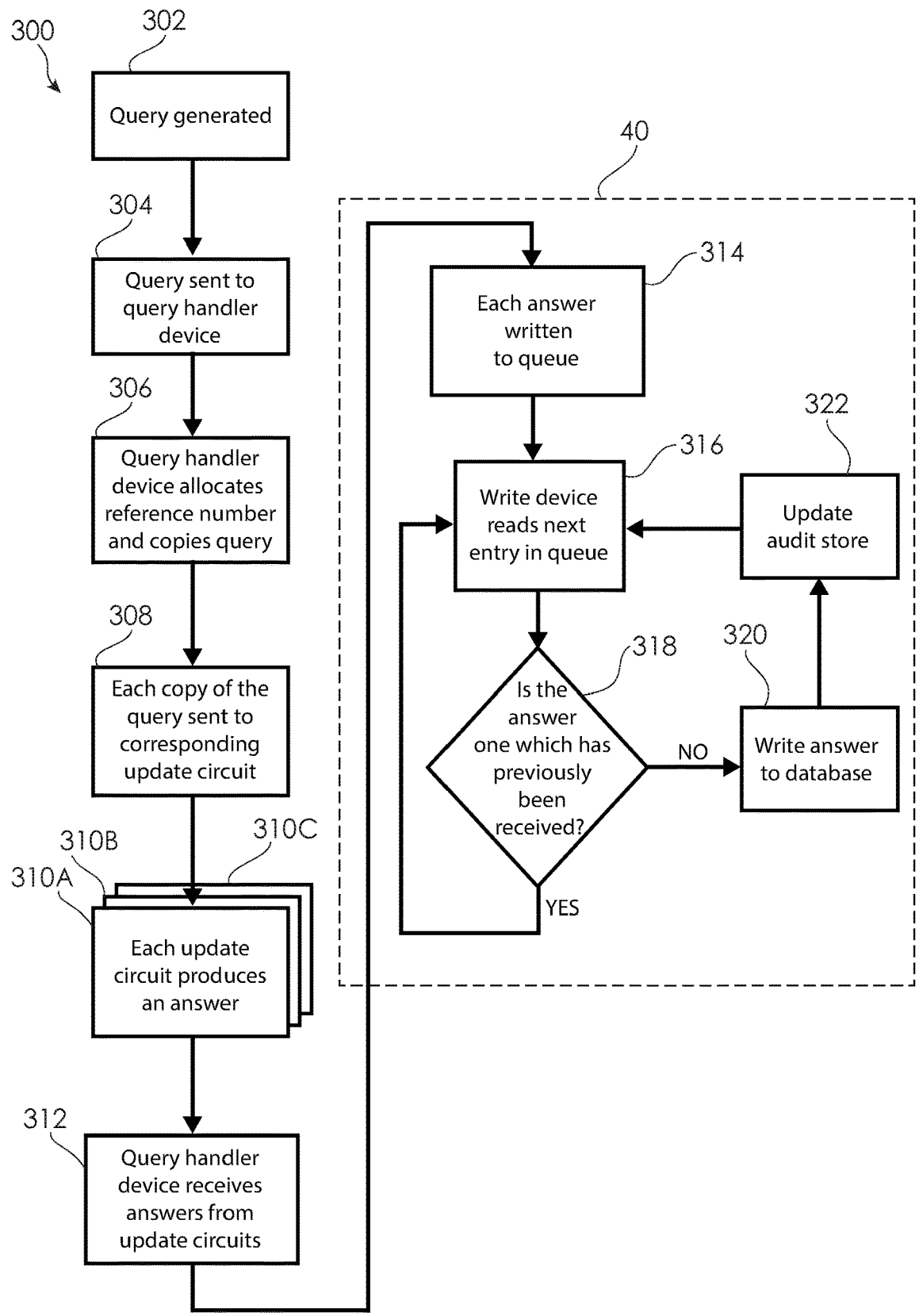
FIG. 6 comprises a flow diagram of operation of the system of FIG. 1 as configured in accordance with various embodiments of these teachings.

The operation of the system 10 illustrated in FIG. 1 now be described with reference to the flow chart 300 of FIG. 6. At the initial step, step 302, a query is generated. The query is generated by the network service provider 14 in the manner described above. At step 304 the query is sent to the query handler device 16 over network connection 24.

Once the query handler device receives the query, it will allocate a reference number to the query and copy the query, unless the source of the query has already generated a reference number. The query handler device 16 produces as many copies of the query as there are update circuits. In the embodiment illustrated there are three update circuits and therefore three copies of the query are produced.

At the following step, step 308, each copy of the query is sent to a corresponding update circuit. In this embodiment, the query is sent to the update circuits 18A, 18B and 18C, together with the reference number, over the corresponding network connection 28A, 28B and 28C. Each copy of the query will be provided with the same reference number.

Each update circuit 18A, 18B and 18C calculates an answer for the query, steps 310A, 310B, 310C, and returns the answer as a response to the query handler device over the corresponding network connection 28A, 28B and 28C.

In the example considered above, the query is whether the account associated with user device 12A has sufficient funds to establish a communications channel with user device 12B, taking into account routing and location information, together with appropriate tariffs.

Audit store 60, stored in the internal storage of the query handler device 16, comprises reference number column 62 and answer column 64. Each answer written to the database 22 has a corresponding record in the audit store comprising reference number field 62A and answer field 64A.

Referring back to FIG. 6, step 312, the query handler device 16 receives each of the responses from the update circuits 18A, 18B and 18C. Each response, as it is received, will have its corresponding answer written to the audit store 60. Once a response is received, the query handler device will determine whether that response is the first received response for that query (step 318) by comparing the reference number for the received response against the entries in the audit store 60.

If it is determined at step 318 that the response for this query has previously been received, that response is discarded and the query handler will return to step 316 where the next response is processed.

On the other hand, if it is determined at step 318 that a response for this query has not been previously written to the database, the process proceeds to step 320 where the entry is written to the database 22. Once the answer has been written to the database 22, the process proceeds to step 322 where the audit store 60 is updated by inserting the reference number and answer written to the database in the previous step 320. It is to be realized that the writer device 20 comprises a lock to ensure that the same answer is not written twice to the database. Such locks are well known and will not be further described herein.

Figure 7:
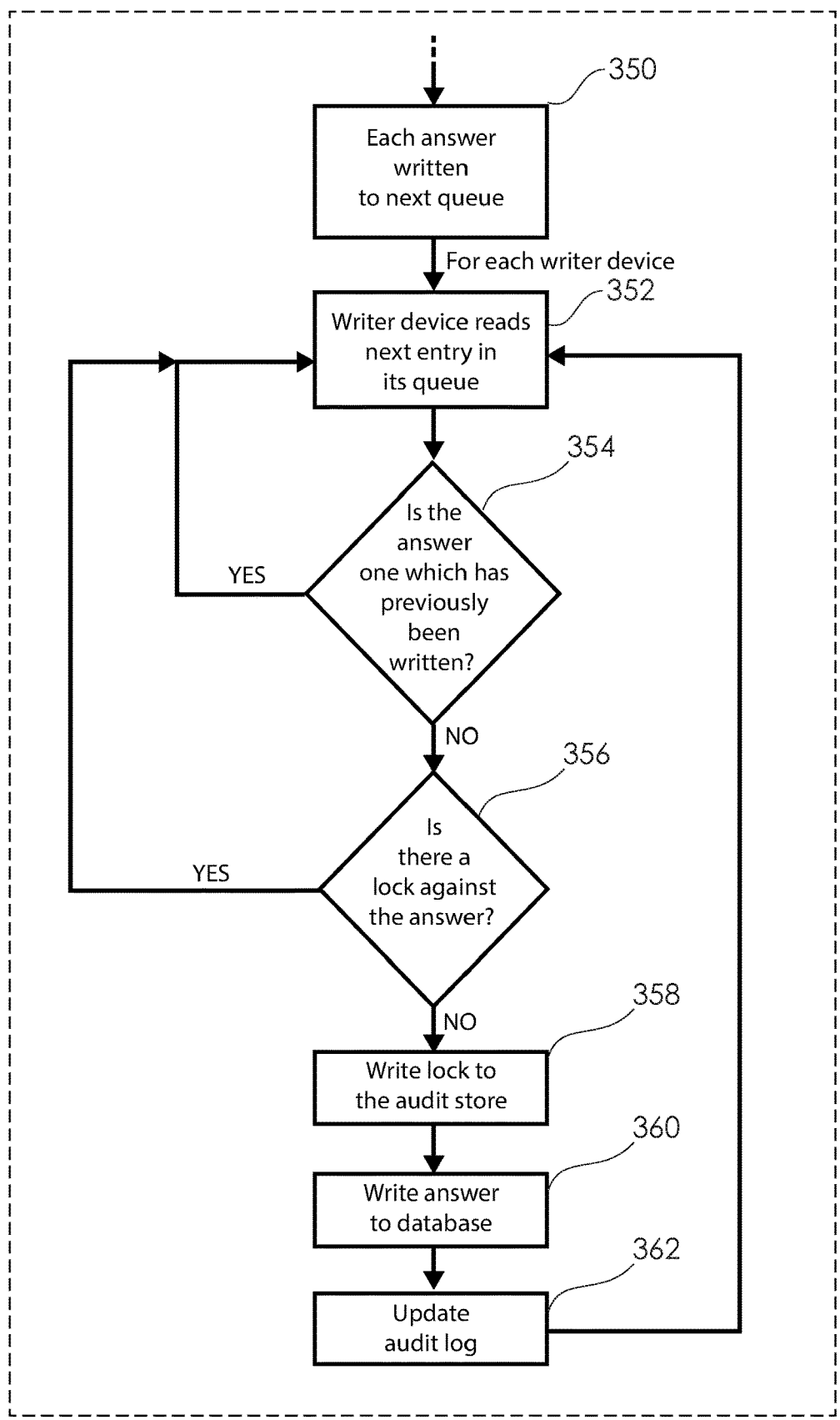
FIG. 7 comprises a flow diagram of operation of the system of FIG. 3 as configured in accordance with various embodiments of these teachings.

FIG. 7 illustrates a portion of the process according to which the system 100 illustrated in FIG. 3 operates. The process steps of FIG. 7 replace the process steps within the dashed box 40 of FIG. 6.

Therefore, instead of progressing to step 314 from step 312, the system 100 progresses to step 350. As previously discussed, the system 100 differs from the system 10 in that multiple writer devices 120A and 120B are provided and each of the corresponding internal storages 132A and 132B stores a corresponding queue 160A and 160B. Therefore, the query handler device 16 will send answers as received as responses from the update circuits 18A, 18B and 18C to writer devices 132A and 132B in an alternating fashion.

At the next step, step 352 (the following steps all occurring at each of the writer devices), the writer device reads the next entry in its queue. Then, at decision step 354, a determination is made as to whether the answer is one which has previously been written to the database 22. This determination is made in the same way as the determination at step 318 described above with reference to FIG. 6, but in this instance, the determination is made with reference to the audit store 200. If that answer has previously been written, the process will return to step 352.

It is generally desirable to prevent multiple writes to the same record in the database 22 (FIG. 3). As previously described, if that database is an integral unit, then the writer devices will include locking mechanisms. However, where the database 22 is distributed, embodiments may implement a locking mechanism which is described in further detail with reference to FIG. 7.

If the answer has not previously been written to the database 22, the process proceeds to step 356 where it is determined whether or not a lock exists against the answer. In this embodiment, the lock comprises a current entry in the audit store 200, as described in further detail below.

If it is determined at step 356 that a lock does exist against the answer, the process returns to step 352 and the next query in its queue is read and dealt with in the same manner. In order to ensure that the missed query is not discarded, that query will be rewritten to the queue.

If it is determined at step 356 that a lock does not exist against the answer, the process proceeds to step 358 where the lock is written to the audit store 200. In this embodiment, the lock comprises a reference number being written to the reference number column 202, without the corresponding answer being written in the answer column 204. Referring back to step 356, the writer device will determine whether a lock exists against the current answer by determining whether or not the reference number for this particular query exists in the reference number column 202 without a corresponding answer being written to the answer column 204.

Then, at step 360, the answer is written to the database 22 and, at the following step 362, the entry in the audit log 200 is completed by writing the answer to the answer column corresponding to the reference number previously written as a lock, thereby completing that entry for the audit log 200.

The process will then return to step 352 where the writer device reads the next entry in its queue.

As mentioned, the process of FIG. 7 will be repeated for each of the writer devices illustrated in FIG. 3. Each of the writer devices 120 A and 120 B will run through the same process, dealing with each of the entries in the corresponding queues 160A and 160B.

Since the audit log 200 is shared amongst all of the writer devices, the lock will ensure that no two writer devices will attempt to adjust the same entry in the database 22 at the same time.

Since the original query originated from the network service provider 14 (FIG. 1), the query handler device 16 will return the answer which has been written to the database 22 to the network service provider 14 which will then use that information to allow, or deny, a communications channel between user device 12A and user device 12B.

Since the audit logs 60, 200 comprise a record of all of the queries and their corresponding answers, it is possible to rebuild the database from the audit logs in the case of a failure affecting the database. In a further embodiment, the audit log further stores the previous value updated by a particular write operation, as well as the answer which is then written.

In a further embodiment, the query handler device 30 is able to break down a received query into one or more sub-queries. In this case, the query handler device 30 is able to determine that the received query comprises two or more dependent sub-queries. The query handler device 30 is then able to deal with sub-queries in the same manner as it deals with queries, as described above. However, since the sub-queries are generally dependent, the answer for one of the sub-queries may be required as an input to one or more of the other sub-queries.

For example, if a query can be divided into a first sub-query and a second sub-query where the answer to the first sub-query is used in the second sub-query, the query handler device will receive the query, formulate a first and a second sub-query, create duplicates of the first sub-query, send each of those duplicates to the respective update circuits and, when the first response is received, send duplicates of the second sub-query, each with a copy of the answer to the first sub-query, to respective update circuits and process the first-received response. Once the sub-queries have been processed, the query can be handled in the same way as the queries described above. In this embodiment, it is necessary for the query handler device 30 to keep track of the dependencies between sub-queries and this is done in a known manner.

1. Electronic Communication Network

The electronic communication network(s) are any type of electronic communication networks such as the internet, wireless networks, wide area networks, local area networks, cellular networks, or combinations of these or other networks. Other examples of networks are possible.

The electronic communication network(s) include various electronic elements that route, track, monitor, transmit, and/or receive electronic communications, messages, and/or data. For example, the electronic elements may include switches, routers, gateways, control circuits, memory storage devices, transmitters, receivers, and/or other types of electronic devices or elements.

Each of these elements (or combinations of the elements) may be configurable, adjustable, and/or programmable. In aspects, an electronic control signal is applied to these elements that causes a particular one of the elements to perform a function. For example, one of the electronic elements (or elements) may be configured to allow a user to utilize a certain data speed for an electronic device on the network. In another example, one of the electronic elements (or elements) is configured to halt data usage for a user with an electronic device operating in the network. It will be appreciated that the configuration process may change the state of one of the electronic elements. In one particular example, an electronic switch may be moved from a first position to a second position. Other examples are possible.

As mentioned, electronic control signals from a control circuit are applied to electronic elements in a network to be provisioned. The control signals, in aspects, are effective to alter the states of the elements or change information flow, or aspects of information flow, in the network. For example and as mentioned, electronic switches may be changed to different positions or the speed of data reduced (or increased) for particular users at particular electronic elements in the network.

2. Update or Control Circuit

It will be appreciated that as used herein the terms "update circuit" or "control circuit" refer broadly to or includes any microcontroller, computer, virtual machine or processor-based device with processor, memory, and programmable input/output peripherals, which are generally designed to govern the operation of other components and devices. It is further understood to include common accompanying accessory devices, including memory, transceivers for communication with other components and devices, etc. These architectural options are well known and understood in the art and require no further description here. The update or control circuit may be configured (for example, by using corresponding programming stored in a memory as will be well understood by those skilled in the art) to carry out one or more of the steps, actions, and/or functions described herein.

Embodiments of this disclosure are described herein, including the best mode known to the inventor(s). It should be understood that the illustrated embodiments are exemplary only and should not be taken as limiting the scope of the appended claims.

What is claimed is:

1. A system for configuring electronic elements in an electronic communication network, the system comprising:
   a query handler device, the query handler device being coupled to a first electronic communication network, the query handler device being disposed at a central processing location;
   a plurality of update circuits, each of the plurality of update circuits being arranged to operate electronically in parallel with the others, the plurality of update circuits being coupled to the query handler device;
   a database, the database storing data entries that include subscriber information;
   at least one writer device, the at least one writer device being coupled to the database;
   wherein the query handler device is configured to:
      receive a query from a network service provider;
      separate the query into a plurality of subqueries;
      selectively copy each of the plurality of subqueries into individual selected sets of subqueries, wherein each member of each of the individual selected sets is a copy of one of the plurality of subqueries;
      for each of the individual selected sets of subqueries, selectively transmit each subquery in the individual selected sets of subqueries to a selected individual one of the update circuits;
   wherein each of the update circuits is configured to:
      receive one subquery from one of the individual sets of subqueries;
      determine an answer to the one received subquery, the answer being determined potentially in parallel time relation with respect to answers being determined at other update circuits;
      transmit the answer to the query handler;
   wherein the query handler device determines a first answer to each of the subqueries, the first answer for each subquery being received by the query handler device first-in-time compared to the other answers for each subquery;
   wherein the query handler device determines an answer to the query based upon the first answers to the subqueries;
   wherein the at least one writer device is configured to:
      receive the answer to the query;
      adjust an entry in the database according to the answer to the query using a write operation such that no other adjustment to the entry can occur until the write operation is completed;
   wherein the query handler device is configured to transmit the answer to the query to the network service provider via the first electronic communication network;
   wherein the network service provider responsively adjusts and configures electronic network elements in a second electronic communication network in conformance with the answer to the query.

2. The system of claim 1, further comprising at least one electronic queue, the at least one electronic queue being electronically coupled between the update devices and the at least one writer device, the at least one electronic queue configured to temporarily store the answers determined by the update devices.

3. The system of claim 2, wherein the at least one electronic queue is a single queue.

4. The system of claim 2, wherein the at least one electronic queue comprises a plurality of separate queues.

5. The system of claim 1, wherein the at least one writer device locks the query prior to performing the write operation and removes the lock once the write operation is completed.

6. The system of claim 1, wherein the at least one writer device comprises a single writer device.

7. The system of claim 1, wherein the at least one writer device comprises a plurality of separate writer devices.

8. The system of claim 7, wherein the at least one electronic queue comprises a plurality of separate queues.

9. The system of claim 1, further comprising a third electronic communication network electronically coupled between the at least one writer device and each of the update circuits, wherein a range of data communication latencies exist between each of the update circuits and the at least one writer device.

10. The system of claim 1, wherein the database and the at least one writer device are disposed at the central processing location.

11. A method for configuring electronic elements in an electronic communication network, the method comprising:
   arranging a plurality of update circuits to operate electronically in parallel with the others;
   storing data entries that include subscriber information in a database;
   at a query handler device that is disposed at the central processing location, receiving a query from a network service provider, and separating the query into a plurality of subqueries;
   selectively copying each of the plurality of subqueries into individual selected sets of subqueries, wherein each member of each of the individual selected sets is a copy of one of the plurality of subqueries;
   at each of the update circuits, receiving one subquery from one of the individual sets of subqueries, determining an answer to the one received subquery, the answer being determined in parallel time relation with respect to answers being determined at other update circuits, and transmitting the answer to the query handler;
   wherein the query handler device determines a first answer to each of the subqueries, the first answer for each subquery being received by the query handler device first-in-time compared to the other answers for each subquery;
   wherein the query handler device determines an answer to the query based upon the first answers to the subqueries;
   at the at least one writer device, receiving the answer to the query, and adjusting an entry in the database according to the answer to the query using a write operation such that no other adjustment to the entry can occur until the write operation is completed;
   at the query handler device, transmitting the answer to the query to the network service provider via the first electronic communication network;
   wherein the network service provider responsively adjusts and configures electronic network elements in a second electronic communication network in conformance with the answer to the query.

12. The method of claim 10, further comprising temporarily storing the answers determined by the update devices in at least one electronic queue, the at least one electronic queue being electronically coupled between the update devices and the at least one writer device.

13. The method of claim 12, wherein the at least one electronic queue is a single queue.

14. The method of claim 12, wherein the at least one electronic queue comprises a plurality of separate queues.

15. The method of claim 11, wherein the at least one writer device locks the query prior to performing the write operation and removes the lock once the write operation is completed.

16. The method of claim 11, wherein the at least one writer device comprises a single writer device.

17. The method of claim 11, wherein the at least one writer device comprises a plurality of separate writer devices.

18. The method of claim 17, wherein the at least one electronic queue comprises a plurality of separate queues.

19. The method of claim 11, further comprising a third electronic communication network electronically coupled between the at least one writer device and each of the update circuits, wherein a range of data communication latencies exist between each of the update circuits and the at least one writer device.

20. The method of claim 11, wherein the database and the at least one writer device are disposed at the central processing location.

21. The system of claim 1, wherein the query comprises a first subquery and a second subquery, and a first answer to the first subquery is supplied to and utilized by the second subquery.

22. The method of claim 11, wherein the query comprise a first subquery and a second subquery, and a first answer to the first subquery is supplied to and utilized by the second subquery.

\* \* \* \* \*